INVENTOR.
HAROLD F. MAY

Aug. 14, 1951          H. F. MAY          2,564,403
ELECTRICAL AND CYCLICAL DATA POSTING SYSTEM
Filed Jan. 27, 1949          4 Sheets—Sheet 3
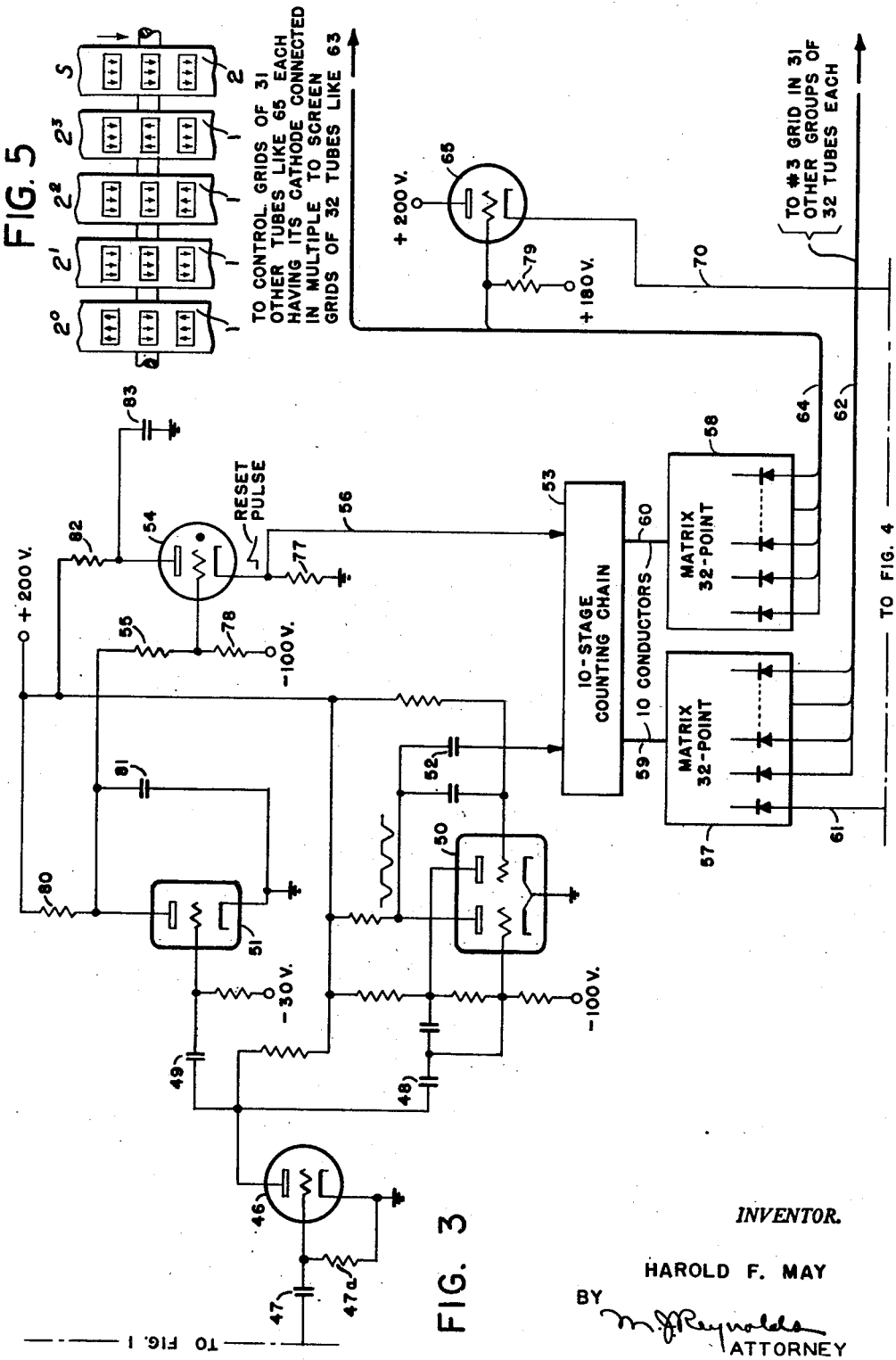
INVENTOR.
HAROLD F. MAY
BY
M. J. Reynolds
ATTORNEY

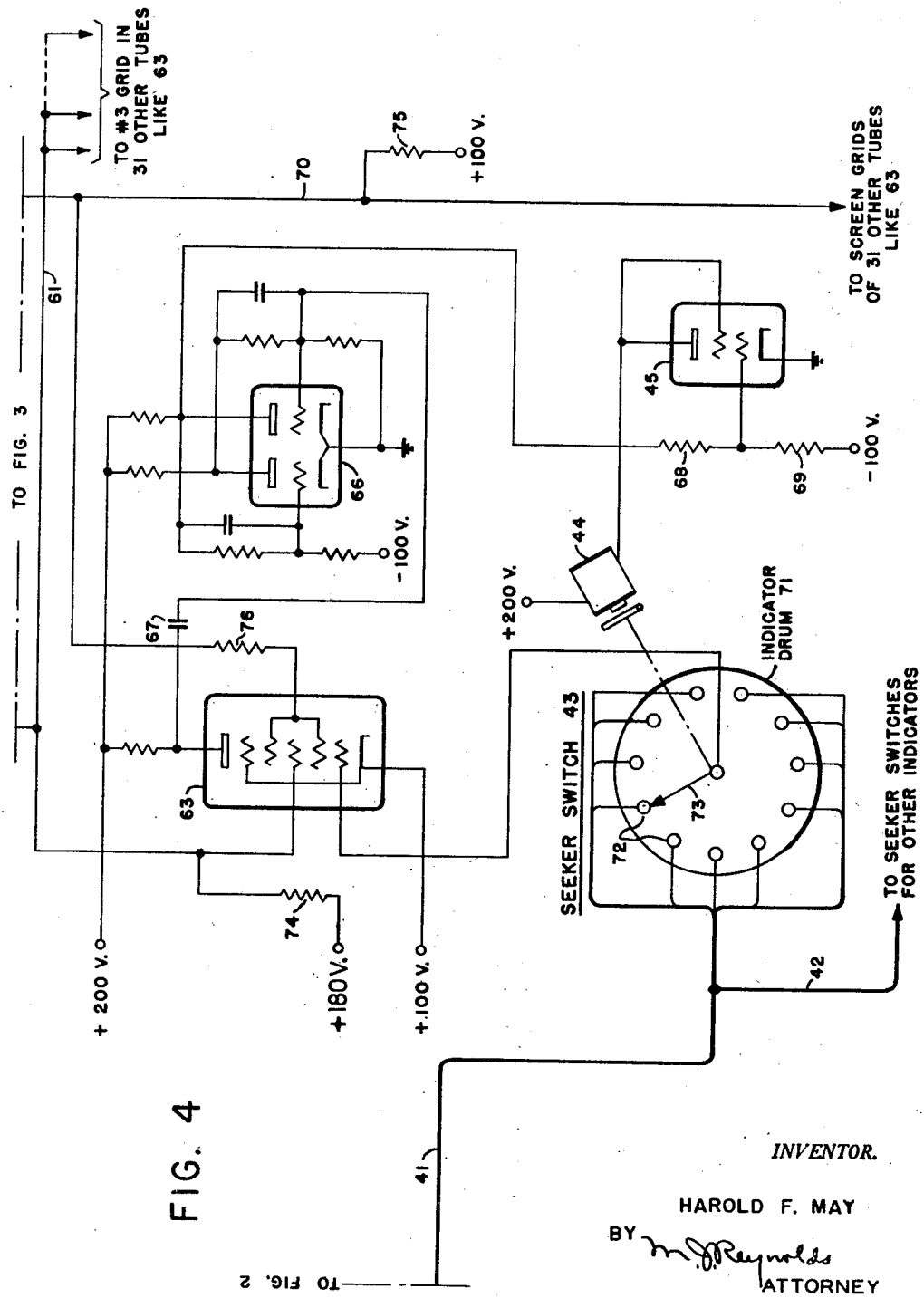

Patented Aug. 14, 1951

2,564,403

UNITED STATES PATENT OFFICE 2,564,403

ELECTRICAL AND CYCLICAL DATA POSTING SYSTEM

Harold F. May, Valley Stream, N. Y., assignor to The Teleregister Corporation, New York, N. Y., a corporation of Delaware Application January 27, 1949, Serial No. 73,201

10 Claims. (Cl. 177—353)

This invention relates to electrical and cyclical data posting systems such as are required for the display of statistical information, either as it is fortuitously stored for an indefinite time, or where the data is to be posted directly in response to received signals.

In the utilization of electronic or magnetic data storage systems, it is frequently necessary to bring out the stored information at a very rapid rate because the storage system itself may be used repetitively for storing different items. In electronic calculators, for example, the data may be introduced and extracted at a rate which is measured in microseconds for each item. If such data is to be transferred by a read-out process into an indicator display, it is apparent that it could only respond once in a very long cycle compared with the time intervals allowed for the read-out of individual data items.

Accordingly, it is an object of my invention to provide a data posting system which will accept and utilize posting signals applicable to the setting of a plurality of electro-mechanically operable indicators, where the rate of acceptance of such signals is many times greater than the rate at which successive setting operations could be performed in respect to a single indicator unit.

It is another object to provide a system for data storage, read-out, and translation of signals into indicator setting operations.

Still another object is to provide a group of electro-mechanically settable indicator units in combination with trigger-acting selecting mechanism whereby the time allowance for setting an indicator unit may be made considerably longer than the time cycle given to each triggering signal, whereby an overlap of setting movements for different indicator units may be had.

Again, one of the objects is to provide a novel data storage and posting system including impulse-responsive means for setting a plurality of indicator units to agree with the intelligence that was previously stored on record tracks of a magnetic data storage medium; this medium being subjected to continuous cyclic scanning for read-out purposes while new items of data may at any time be recorded on said record tracks to replace old items.

Once more, it is an object to provide a novel data posting system including step-by-step setting mechanism for a plurality of indicator units and signal responsive comparison means, operable in rapid succession with respect to each indicator unit to effect a setting movement therefor whenever its current indication fails to correspond with the significance of a given signal.

The foregoing objects and others which will be made apparent in the description to follow are to be achieved by the utilization of a data posting system which may be briefly described as follows and by way of example.

Assuming that there is a group of rotary drum type indicators to be actuated and that different categories of items are to be indicated by different indicators, as for example, in a stock quotation board, my system comprises means for selecting these indicators to be actuated whenever the data to be posted thereon is different from what is already displayed. Accordingly, an important element in the system is a comparator which tests each signal as applied to a different indicator setting mechanism to determine whether or not that setting mechanism should be operated.

The signals for causing the actuation of a setting device are switched by electronic means cyclically into the control circuits for each of the individual indicator units. While this cyclic switching is going on, the data to be posted is read out of a storage medium such as a continuously rotating storage drum or disk. Reading heads are provided for scanning the data record paths. The reading heads control amplifiers which in turn deliver their output to some sort of decoding device, because usually it is economical to store the data in coded form. The present invention is illustrated by the use of the binary code of numbering. Considering that each indicator drum may have as many as eleven positions for its setting, a 4-unit signal code has more than a sufficient number of permutations for causing selection of any desired position at which to set the drum. The 4-unit code which I prefer conforms to the binary system of numbers.

Decoding of binary numbers is readily accomplished by means of a matrix which, for example, may comprise a system of crystal diodes. The output from such a matrix may then be presented to the comparators of different indicator units while at the same time electronic equipment is utilized to obtain these comparisons successively and in a predetermined sequence in respect to different indicators.

The applied siginals, decoded by the matrix with the rapidity of reading the data out of storage, may then be utilized whenever permitted by each individual comparator for causing the actuation of a setting mechanism for the associated indicator, thereby to step the indicator toward the setting at which it is finally to be brought to rest to correspond with the decoded signal. The setting mechanism is such that the indicator takes only one step per cycle of scanning of the stored data. It may, therefore, not reach the intended setting until the reading cycle has been repeated a number of times. This fact is no serious disadvantage, however, because with the proven practice of reading out stored information from the recording tracks of a magnetic drum or disk, it is possible to obtain readings of as many as 10,000 items in one second. Assuming that the cyclic rate for the read-out is 10 cycles per second, it is evident that an eleven-position indicator may be set from any one of its current positions to any new position within one second or less, utilizing only one step per cycle for the operation of its setting mechanism.

A time interval is allowed for the actuation of any setting mechanism which may extend over a major part of the read-out cycle for all the categories of items that are to be stored. During any single cycle, therefore, any or all of the indicators which are to be reset will be made responsive to the cyclic read-out of the stored signals. The signals are decoded successively and are applied to different indicators in a predetermined sequence. An electronic counting chain is provided for determining this sequence. It is synchronized with respect to the rotation of the magnetic disks or drum. The output from the counting chain is made use of in connection with one or more matrices similar to the one aforementioned, whereby individual circuits are selected in succession corresponding to the different indicator units. Each unit is provided with an electronic gate that is subject to joint control by the output circuits from the matrices and by a pulse which is delivered through the comparator of the indicator to be actuated. The coincidence of two or more control pulses causes the gate to deliver a triggering signal to the indicator setting device and the effect is prolonged sufficiently to allow the setting device to complete its operation.

My invention will now be described in more detail, reference being made to the accompanying drawings in which—

Fig. 3 shows some of the electronic equipment which includes an electronic counting chain and, in addition thereto, certain matrices for individualizing the counting pulses that are derived from the read-out of a magnetically recorded pulse train or a continuous wave form as recorded on a synchronizing disk;

Figure 1:
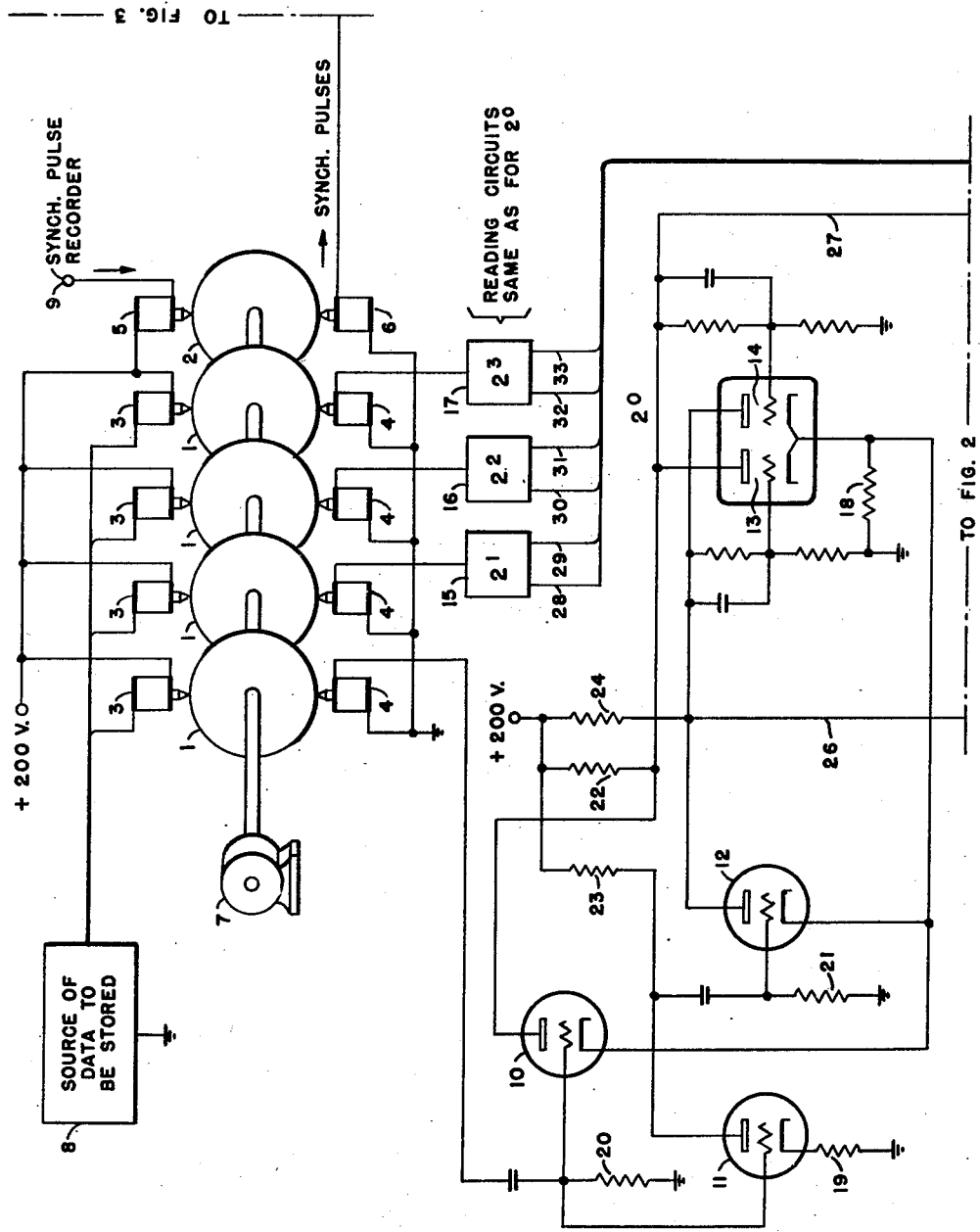
Fig. 1 shows diagrammatically, a magnetic data storage device including a plurality of recording disks or drums on which statistical items may be recorded and from which these items may be read out in serial order.
Figure 2:
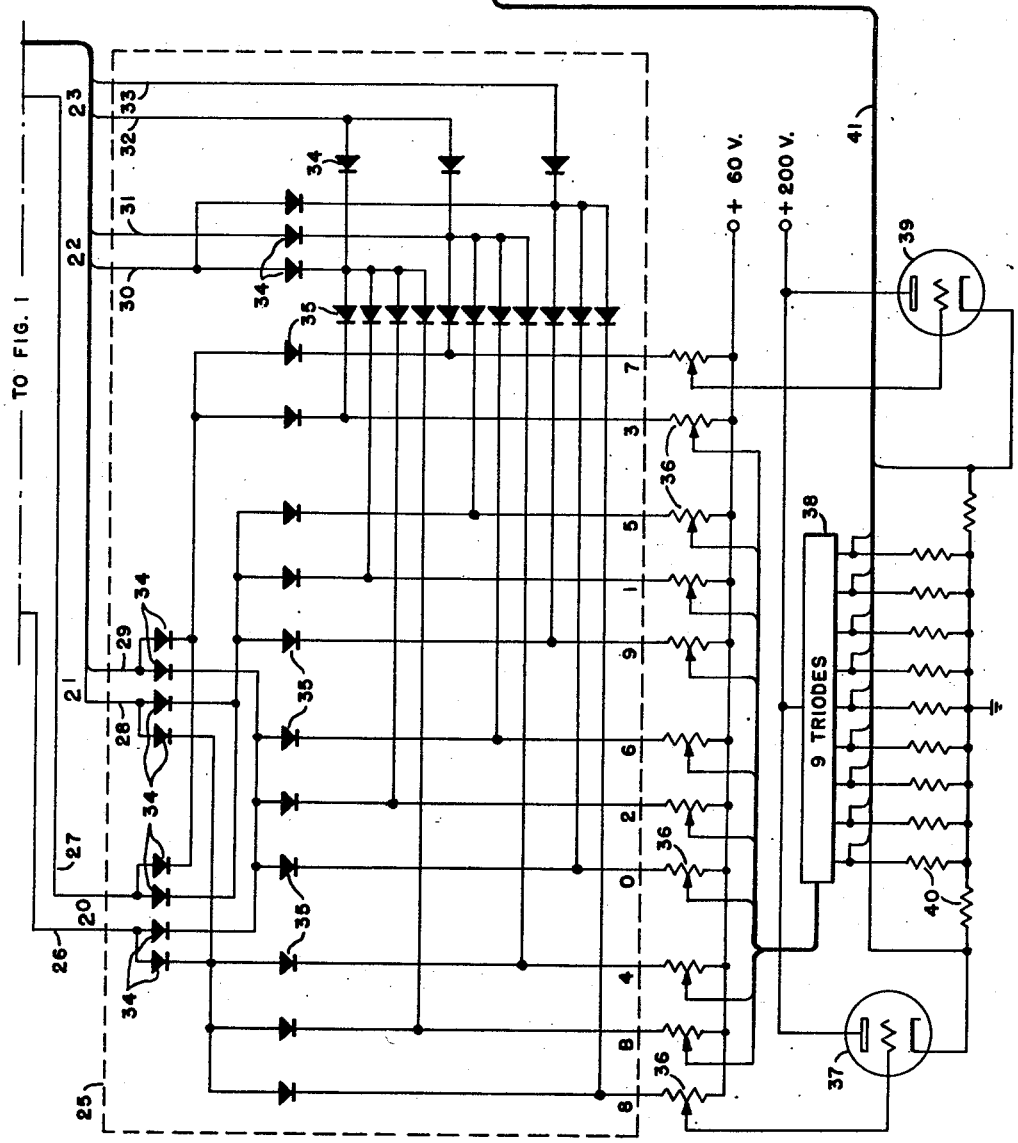
Fig. 2 shows one of the matrices for decoding the signals as read out from the magnetic storage device.

Fig. 4 shows diagrammatically one of the comparators in association with an indicator drum and its setting mechanism and, further, certain electronic equipment which includes an electronic gate for triggering the setting mechanism whenever it is necessary to reset the drum; and Fig. 5 is a diagrammatic development of corresponding portions of the surfaces of the record disks of Fig. 1, showing three successive individual rows of simulated spots of magnetization representing recorded data and associated synchronizing pulses.

*The data storage device*

In one of the forms of my invention it is convenient to use a continuously rotatable system of magnetic drums or disks, on the peripheries of which the data is stored magnetically. Disks 1 are therefore indicated in the drawing as mounted on a common shaft driven by a motor 7. Each disk may have a single recording path thereon, or if more than one path is desired, the recording may be applied to the face of the disk and near the periphery. Concentric rings of recordings may thus be provided, although this has not been shown in the drawing. In fact, because the recording and reading heads would be mounted with the least possible air-gap between their pole pieces and the disk faces, it has been found that recordings independent of one another may be made on the two sides of a single disk and may be utilized simultaneously. The digits of a binary number may be recorded in different paths or they may be disposed sequentially along a single path. Either method of recording is well known in the art.

If recording drums are used, the record paths may be disposed on the cylindrical surfaces of one or more drums. These are different alternatives of recording techniques which are also well known in the art. The drawing merely shows conventionally how a cyclic recording and read-out system may be utilized for the carrying out of the objects of my invention.

On the same shaft with the data recording disks or drums, I provide a synchronizing disk 2, which bears a record of a synchronizing pulse train. This record preferably extends through an arc of some 320° to 340° leaving a blank or unrecorded arc, so as to provide a certain time interval between successive scannings of the data record. This intervening time interval is utilized to re-set the electronic counting chain.

Assuming that there is a source of data to be stored, as represented by the block 8, this information may be transferred by well known means to the record disks 1, utilizing magnets 3, whose pole pieces are in close proximity to the recording paths. The pulses to be recorded for different categories of items may be gated into the recording heads 3 so as to place each item individually at an appropriate angular position around the disks 1, according to its category assignment, and according to a count of synchronizing pulses as obtained from a cyclic read-out of the recorded pulse train which is scanned by a reading head 6. The technique for doing this is shown in a co-pending application of Dale H. Nelson, Serial No. 42,356, which was filed August 4, 1948, and assigned to the assignee of the instant application.

Let it be assumed that binary numbers are to be used for storing the statistical items. Let it also be assumed that each stored item is so positioned on the disks or drums that its angular position serves to identify the category to which the item relates. Then the categories can be numerically indexed in the same order in which their items are angularly positioned. This means that, while the reading heads 4 are delivering a train of signals which represent the numerical values for each item, the index number for each of these items may be derived from the scanning of the pulse record on the synchronizing disk 2. This pulse record may be applied prior to the storage of items as obtained from the source 8, and may be considered permanent for all practical purposes. Any suitable source of periodic pulses may be connected to terminal 9 for energizing the synchronizing pulse recording head 5 while the disk 2 makes one revolution. The frequency of the pulses is adjusted so as to provide proper spacing of magnetized spots on the disk 2, and to spread these spots uniformly and in sufficient number to take care of all the categories of items that are to be stored, leaving an arc of separation between the trailing end and the front end of the synchronizing pulse record track.

Any desired number of items within reasonable limits may be applied in different angular positions around the disk or drum. I have found that if the drum is approximately 18" in diameter and is rotated at a speed of 1200 R. P. M., as many as 1024 categories of items may be stored thereon for cyclic scanning by the reading heads. The reading heads 4, are shown in operative position for scanning the data records. The reading head 6, is also shown for scanning the synchronizing pulses. One of the reading heads has its electrical circuit connections shown in detail. This reading head may be assumed to read out the record of the digit 2° of a binary number. Other digits of this number are also read out by the remaining three of the reading heads 4, where the circuits for these remaining reading heads are exactly the same as the one which is shown in detail. But for the sake of simplicity in the drawing, the reading circuit is not duplicated in detail; each separate reading circuit being indicated by blocks 15, 16 and 17 and being designated for the binary digits $2^1$, $2^2$, and $2^3$.

Fig. 5 is a diagrammatic development of corresponding fragmentary portions of the surfaces of the record disks of Fig. 1, showing the relative locations of three horizontal rows of simulated spots of magnetization (indicated by the small rectangles), each horizontal row representing a binary number together with the associated synchronizing pulse. The first four disks, as viewed from left to right in the figure, respectively represent the digit positions $2^0$, $2^1$, $2^2$, and $2^3$ of each binary number stored thereon, these digit positions being analogous to the units, tens, hundreds and thousands columns of a decimal number. The binary numbers conveniently are composed of the digits "0" (space) and "1" (mark), the marking and spacing signals respectively being represented by magnetized spots of opposite polarity relative to the direction of rotation of the disks; the opposite polarities thereof are indicated by small arrows pointing in different directions. The disk 2, also indicated by the letter S, has the synchronizing pulses recorded thereon and these pulses are all of the same polarity. The lower horizontal row, which would be the first of the three rows to be scanned by the reading heads if the disks are rotating in the direction indicated by the large arrow at the right, is shown as having magnetized spots representing the binary number 101 (0101) which, if translated into a decimal code in the manner hereinafter disclosed, would cause the energization of a selected output circuit corresponding, for example, to the digit 5 in the decimal code. The second horizontal row has magnetized spots representing the binary number 1000 which may be translated into digit 8 in the decimal code, and the upper horizontal row has magnetized spots representing the binary number 1 (0001) which may be translated into digit 1 in the decimal code. Thus the three horizontal rows shown respectively store in binary code the digits 5, 8 and 1, and these digits may be set up on three associated electromagnetic indicators of a group to represent a three-digit number in decimal code or they may be set up individually on separate indicators to represent three different items of information. It will be appreciated that each of the magnetized spots is quite small in size, and that they have been enlarged in the figure for the purpose of illustration.

In more detail, the reading circuit includes two amplifier tubes 10 and 11, here shown for example as triodes. These tubes have a common grid resistor 20 connected to ground. Their anodes are connected to the positive terminal of a D. C. source through resistors 22 and 23 respectively. The cathodes of tubes 10, 12 and the twin triode tube 13, 14 have a common cathode resistor 18 which connect them to ground. The cathode of tube 11 is connected to ground through a resistor 19.

Triode tube 12 is a phase inverter with respect to tube 11 and is controlled by the coupling of its control grid to the anode of tube 11. Tubes 10 and 12 are, therefore, driven conductive or non-conductive in opposing phase by any readout pulse of full wave form. The anodes of tubes 10 and 12 are directly connected respectively to the anodes of two space paths 13 and 14 which, for convenience, may be included in one envelope. For brevity of description, these space paths will be referred to as though they were separately enveloped. The two space paths as shown in the drawing represent components of a conventional flip-flop circuit. That is to say, the circuit is so arranged that when one space path is conductive the other is blocked, and vice versa. Due to the cross-couplings between anodes and grids the blocking of one space path always causes the other space path to become conductive and the conductance of either space path contributes toward stabilizing the blocked condition in the other space path. The flip-flop circuit therefore rests in either position to which it is triggered from an outside source.

In addition to the anode resistors 22 and 23 already mentioned for tubes 10 and 11 resistor 24 is provided for connection of the +200 v. source terminal to the anodes of tubes 12 and 14. It will be observed that the anodes of tubes 10 and 13 are maintained at the same potential; also that the anodes of tubes 12 and 14 are maintained at the same potential.

The mode of operation of the reading circuits for each of the binary digits may be explained as follows: Assuming that the reading of a magnetic spot which represents a mark signal produces a single cyclic pulse the front half of which is negative, this front half cycle blocks tubes 10 and 11 and renders tube 12 conductive. The reduced anode potential in tube 12 imposes a negative bias on the grid of tube 13 and, if this tube was not previously blocked, it now will be, thereby causing tube 14 to become conductive, due to the resistive and capacitive coupling between the anode of tube 13 and the grid of tube 14.

The above control is only transitory and is immediately reversed upon amplifying the trailing positive half-cycle of the pulse. At this time tube 10 becomes conductive and its lowered anode potential causes tube 14 to be blocked. Tube 13 then becomes conductive, not only by virtue of the cross-coupling between the two sides of the flip-flop device, but also in view of the fact that tube 12 has now been rendered non-conductive and its relatively high anode potential is impressed through a resistor on the grid of tube 13.

I always utilize the trailing half cycle of the read-out pulse because its effect is stored in the flip-flop tube 13, 14 until it is supplanted by the scanning of the next following item. Intermediate between the scanning of different items, it will be shown presently that a gating operation is performed which gives effect to the decoding of signals. The effect of setting the flip-flop device for conductance either in tube 13 or tube 14 is to apply one of two potentials to each of the input circuits of a decoding matrix 25.

When the read-out signal has a spacing significance its trailing half-cycle is negative. The effect then is to block tube 10 and to render tube 12 conductive. Tube 10 causes tube 14 to become conductive, while tube 12 in its conductive state causes tube 13 to be blocked. By the setting of the flip-flop device 13, 14 in this manner I obtain a relatively low potential for application to conductor 26 and a relatively high potential for application to conductor 27. The pair of conductors 26, 27 is therefore suitably biased for representation of a mark signal in the first described case, and of a spacing signal in the latter case. In like manner, a potential bias is obtained with respect to the output circuit pairs 28—29, 30—31, and 32—33.

As here shown, the several digits of a binary number for each item are read simultaneously by the reading heads 4. So, the bias is set for each of the output circuit pairs 26—33 for obtaining control of a decoding matrix 25, and thus to derive a decimal equivalent representation of the binary number that was recorded.

*The decoding matrix*

The purpose of the matrix 25 is to establish a conductive state in all but one of a series of triode tubes 37, 38 and 39 where the one tube which is not conductive represents a decimal digit corresponding to the binary number of the recorded and read-out item signal. The input circuits for the matrix 25 consist of four pairs, one pair for each of the binary digits. The conductor on the left side of each pair is connected with the anode of tube 14 or its equivalent in the other read-out circuits 15, 16 and 17. The right-hand conductor of any pair of input circuit for matrix 25 is connected to the anode of tube 13 or its equivalent in read-out circuits 15, 16 and 17. These input circuits are numbered 26 to 33, inclusive. Taking input circuit 26 for example, it connects the anode of tube 14 through certain of the crystal diodes 34 to two limbs of the matrix, each limb being further branched through a second stage of crystal diodes 35 and carried thence to output conductors which in this case are six in number and which represent the digits 2, 4, 6, 8, 0, and a blank, here labeled B. The B-signal is used to set an indicator to a position which displays no character.

Conductor 27 on the right side of the input circuit pair for the binary digit $2^0$ is connected through one of the crystal diodes 34 and thence through three separate branches including crystal diodes 35 to output circuits for the decimal digits 1, 5 and 9. Through another of the crystal diodes 34 and through further branches which include crystal diodes 35 there are connections to the remaining two output circuits for decimal digits 3 and 7.

The various paths through crystal diodes 34 and 35 may be traced from input to output terminals under conditions of any of the binary digit permutations that are used for representing decimal equivalents and the blank position of the indicator. This blank position, by the way, may correspond to a 0 equivalent of the binary code, whereas the 0 itself may be represented by the binary code equivalent of the decimal number 10.

The matrix as herein shown is not of my invention, but is merely an abbreviated version of a well known matrix for selecting as many as 16 output circuits permutatively so as to block conductance through all but one of them, and any one as selected. The following table shows how the setting of flip-flop tubes such as 13, 14 to represent "0" (space) and "1" (mark) in different digits of the binary numbers may be translated into a decimal digit selection:

| Binary Number | Input Circuits Carrying No Current | | | | Selected Output CCT. |
|---|---|---|---|---|---|
| 0    | 26 | 28 | 30 | 32 | B |
| 1    | 27 | 28 | 30 | 32 | 1 |
| 10   | 26 | 29 | 30 | 32 | 2 |
| 11   | 27 | 29 | 30 | 32 | 3 |
| 100  | 26 | 28 | 31 | 32 | 4 |
| 101  | 27 | 28 | 31 | 32 | 5 |
| 110  | 26 | 29 | 31 | 32 | 6 |
| 111  | 27 | 29 | 31 | 32 | 7 |
| 1000 | 26 | 28 | 30 | 33 | 8 |
| 1001 | 27 | 28 | 30 | 33 | 9 |
| 1010 | 26 | 29 | 30 | 33 | 0 |

Note that the crystal diodes in the matrix prevent feed-back. Also that leading to any selected output terminal of the matrix, there is no conductive path from any flip-flop anode the space path of which is blocked. Furthermore it will be seen that one or more anodes of blocked space paths in the flip-flop tubes will be offered a conductive path for its high potential that may be traced to every one of the non-selected output terminals of the matrix.

*Utilization of de-coded read-out signal*

It has been shown above that any one of eleven binary numbers may be translated by the matrix 25 into its corresponding decimal digit. All but one of the output circuits has a high anode potential, say +180 v., impressed upon it. The selected output circuit transmits no current because there is substantially no voltage drop between the four low potential anodes (of conducting triodes) and the lower end of a selected potentiometer 36. Each of these potentiometers 36 is connected between a +60 v. source and a respective one of the matrix output terminals.

Each of the triode tubes 37, 38, 39 represents a different decimal digit or B, the blank position, for setting an indicator. The grid of each tube is connected to a tap on a respective one of the potentiometers 36, so as to respond to control by the operation of the matrix. The anodes of these tubes are maintained at a potential of, say, +200 v., while their cathodes vary in potential according to the voltage drop through their respective cathode resistors 40, all connected to ground. Tubes 37, 38, 39, therefore, operate as cathode followers. The value chosen for their cathode resistors is such that the cathode voltage will substantially follow the applied grid voltage. The cathodes of tubes whose grids are very positively biased are thus conditioned to deliver gating pulses to selecting circuits for contributing to the control of the indicator setting mechanisms.

Each of the cathodes of tubes 37, 38 and 39 is connected through a separate conductor in cables 41 and 42 to segments of a seeker switch or commutator 43, there being as many of these switches or commutators as there are indicators to be incorporated into a display board. One of these seeker switches is shown diagrammatically as comprising eleven segments 72, and a wiper brush 73, which rotates with the drum of the indicator. The seeker switches for all other indicators are the same in construction.

The seeker switch 43 operates as a comparator in this manner: Whenever one of the tubes 37, 38 or 39 is rendered relatively non-conductive, its cathode potential has a certain value slightly higher than +60 v., which value is insufficiently high to exercise a controlling effect on the first grid of a gating tube 63, the control circuit being extended through the wiper brush 73. All the other tubes 37, 38 and 39 being conductive the cathode potential is raised to a value of, say, +160 v., and is applied to each of the non-selected segments 72 in the seeker switch 43. So, when the wiper brush 73 rests on any non-selected segment, the high voltage pulse is impressed on the first grid of tube 63. This primes the tube to accept a gating pulse when its turn is reached in a succession of such pulses originated by the counting chain presently to be described.

From the foregoing description it will be seen that I have provided a system for read-out of stored data, for translation of the coded read-out signals into selecting signals, for making comparisons between the significance of the stored data and the indication current made by an indicator drum, and finally for preparing a gating tube to respond to a gating pulse whenever there is a need for stepping the drum toward a new setting which will eventually agree with the stored data. If several steps are necessary to bring about such agreement, the steps will be taken cyclically, as the data signals are scanned.

The sychronizing system

In order to make successive assignments of the read-out signals to different indicator units, I provide a source of synchronizing pulses, and means for distributing these pulses to the gating tubes 63 in the same serial order and at the same cadence as for the distribution of the read-out signals. If the effect of the read-out signal can be prolonged for a few micro-seconds, then the synchronizing pulse may be applied during the period of stretch-out, in which case the scanning of a read-out signal by reading heads 4 and the scanning of the sychronizing pulse train by reading head 6 do not need to be absolutely simultaneous. By the use of flip-flop tubes such as 13 and 14 in the data reading circuits and in a counting chain 53 it is possible to allow for slight irregularities in the settling down of the various tubes into their stable states of conductance or non-conductance. This is particularly important with respect to an electronic counting chain where a tube representing a high digital order is triggered only after the successive triggering of tubes representing lower digital orders. The important consideration, therefore, for selective control of a gating tube such as tube 63, is that during the stretch-out of the longest control pulse, say on its first grid, there shall be an instant when a pulse or pulses are applied to other grids from the synchronizing pulse source, and thus to drive the gating tube conductive.

The triggering pulses should be discrete in order to avoid spill-over of their effects upon gating tubes to which they do not apply. The means for clipping a gating pulse have not been shown in this application, since I may if desired, follow the teachings of the aforementioned application of Dale H. Nelson, Ser. No. 42,356 in that respect. Nelson showed a coincidence unit which was subject to joint control by signals from a plurality of sources. At a certain instant when the signals from all these sources would be simultaneously present the control of a gating tube would be accomplished by the final application of a differentiating pulse of very brief duration.

The counting pulse train as recorded on disk 2 is scanned by reading head 6 and amplified in a tube 46. The circuit of the reading head is coupled to the grid of tube 46 through a capacitor 47, and extends to ground through a grid resistor 47a.

Each synchronizing pulse has a positive half-cycle followed by a negative half-cycle. The negative trailing half-cycle causes tube 46 to be blocked. When tube 46 is blocked, it applies an amplified positive pulse across two capacitors 48 and 49 and thence to the control grids of two electron tubes 50 and 51. Consider first the operation and function of tube 50. It is of the so-called one-shot multivibrator type. That is to say, the input circuit of the left hand triode section is biased to cut-off so that when it is triggered and becomes conductive, this triggered state will be automatically terminated at the end of a predetermined time interval. The time of conductance of the left hand triode section is determined by the values assigned to the circuit parameters of the tube. These parameters are not here specified but are left to the discretion of the circuit designer who would have to meet the timing requirements of a particular installation.

When the left hand section of tube 50 is made conductive, its right-hand section is, of course, blocked. Also, the reduced anode potential in the left-hand section causes negative pulses to be delivered through a circuit which includes capacitor 52 for controlling an electronic counting chain 53. Such a counting chain is well-known in the art and has been conventionally represented here in a single block. For the purposes of the present embodiment, the counting chain would have ten stages, each stage representing a digit of a binary number. The highest number to which the chain will count in this case is 1023. The 1024th count would restore it to 0 again.

For the purpose of insuring a zero setting of the counting chain before the scanning of the synchronizing pulse train on the synchronizing disk 2, it is desirable to utilize a reset pulse so that if there is any overcount or any undercount, due to errors of operation of the reading and counting device, the reset pulse is sure to restore all stages of the counting chain to their starting position. The reset pulse is derived from a circuit which includes a vacuum tube triode 51 and a "Thyratron" triode 54. Tube 51 has its grid biased at, say, −30 v. with respect to its grounded cathode; hence it will respond only to positive half-cycles of the synchronizing pulse train. The on-off switching effect upon tube 51 offers a discharge path for capacitor 81 such that the latter does not take a full charge until the pulse train is terminated. At that time, however, tube 51 is restored to its normally blocked state and the voltage across the capacitor 81 is permitted to rise to a point sufficient to cause ignition in the gaseous tube 54. The grid of this tube is connected to the junction between resistors 55 and 78, the latter being connected to a bias terminal of, say −100 v.

The ignition period of tube 54 depends (among other factors) on the value chosen for a capacitor 83, which is connected to the anode and which, upon discharge, enables tube 54 to be extinguished. The ignition time is sufficient to produce an effective reset pulse through conductor 56 representing the voltage drop through cathode resistor 77. The reset pulse is delivered to one side of each flip-flop stage (not shown) in the counting chain 53, for triggering that stage to its 0-setting. The pulse duration is sufficient to over-ride any possible effect of carry pulses from stage to stage of the counting chain 53.

*The matrices for singling out individual counts*

The matrices 57 and 58 as shown in the present embodiment each include a sufficient network of crystal diode elements for the selection of any one of 32 output circuits. The scheme of the network is in conformity with what is shown for the matrix 25, but is enlarged to cover a wider range of selection. Cable 59 contains 10 conductors representing the pairs of conductors from five stages of flip-flop tubes in the counting chain 53. These five stages represent the five binary digits of lowest order, $2^0, 2^1, 2^2, 2^3, 2^4$.

Correspondingly the matrix 58 has input circuits 60 which constitute 10 conductors or five pairs, which are under control of the five digits of the higher order of binary numbers in the counting chain 53.

Assuming, therefore, that there are 32 output circuits for each of the matrices, it will be understood that these output circuits may be connected to as many as 1024 tubes 63 and the like for individually controlling these tubes one at a time.

The unidirectional conductance of the crystal diodes in matrices 57 and 58 is just the opposite of what is shown for matrix 25. For any binary number setting of the counting chain 53 current will flow through all but one of the output circuits of each matrix. In the selected output circuit the voltage on the two sides of the crystal diodes will be equalized at, say, 180 volts which, when applied to #3 grids of tubes 63, or the control grid of tube 65 will exercise the gating function thereon.

*Joint control of gate tubes by matrices 57 and 5*

The coordination of two selected high-potential output circuits from the matrices 57 and 58 provides for the individual selection of any one of 1024 different gate tubes such as tube 63. Picture a square chassis on which this number of tubes is based, so that there will be 32 rows of tubes containing 32 tubes in each row. Assume that the order of selection of individual tubes is to start with the #0 tube in the lower right hand corner and to proceed upwardly through each vertical row in succession until the #1023 tube is reached in the upper left hand corner of the chassis. Such a chassis mounting of tubes is referred to, not as a practical arrangement, but merely to explain individual selection.

Carrying the foregoing assumptions further, I may connect output conductor 61 from matrix 57 to grid #3 in tube 63 which occupies the position #0 on the tube chassis, that is, the lower right hand corner. The same output conductor 61 will also be connected to grid #3 in the remaining tubes 63 along the bottom row of the chassis. All tubes 63 in any horizontal row will have their grids #3 connected in common to an appropriate one of the output conductors contained in cable 62.

The cyclic selections of output conductors 61, 62 as obtained by the counting chain 53 and matrix 57 are repeated 32 times in order to be coordinated with a single cycle of selections through the matrix 58. Each of the output circuits 64 from matrix 58 is connected to the control-grid of a different one of 32 cathode follower tubes 65, and thence through a resistor 79 to a +180 v. source terminal. Each vertical row of tubes 63 has the screen grids therein connected in common to the cathode of an appropriate one of the tubes 65.

With this arrangement it will be seen that a different vertical row of tubes 63 is conditioned by a high screen grid potential while individual tubes are selected for excitation by their #3 grids. Such selection results from the action of matrix 57 in blocking the flow of current through resistor 74 and raising the voltage on the #3 grid from a normal +60 v. to +180 v. Tubes 65 are normally blocked by maintaining their cathodes at a potential of, say, approximately +100 v., the cathode resistor 75 being connected to the +100 v. source terminal. Note that the grid potential applied through resistor 79 is shown connected to a +180 v. source terminal, but at the grid end of resistor 79 the voltage is reduced to approximately +60 v. by the action of the matrix 58, except with reference to the control circuit for the one tube 65 which is to be selected. Note also that the connection of the +100 v. source terminal through resistor 75, bus 70 and resistor 76 to the screen grid of tube 63 is suitable for normally preventing the excitation of this tube, since its cathode is held at +100 v.

The preceding paragraphs under the caption "Joint control," etc. explain how tubes 63 may be individually selected for activation and in a sequence which is determined by the counting chain 53 and the circuit connections through matrices 57 and 58. It should be recalled, however, that each tube 63 is still further subject to control through its first grid in response to the read-out signal and the latter is effective only when the comparator functions to extend the read-out signal through brush 73 to said first grid.

*The holding circuit for indicator operation*

Tube 66 is connected in a one-shot multivibrator circuit having a —100 v. bias potential applied to the grid of the left-hand triode section to maintain the same normally blocked and the right-hand triode section normally conductive. The right-hand triode section is blocked by a negative pulse applied across capacitor 67 from the anode of tube 63, this pulse reducing the grid potential of the right-hand triode section to a blocking value.

The circuit parameters of tube 66 are arranged to hold this tube in a triggered state for a predetermined time interval sufficiently long to maintain conductance in a switching tube 45, so as to actuate the stepping magnet 44, and thereby to cause the indicator drum 71 to rotate from one position to the next. During the period that tube 66 is off-normal, its right-hand triode section is blocked and this raises the potential on the control grid of tube 45, thereby making this tube conductive. The control pulse is transmitted from the anode of the right-hand triode section in tube 66 through resistors 68 and 69 to the —100 v. source terminal. The first grid of tube 45 is connected to the junction between resistors 68 and 69. The screen grid of tube 45 may be directly connected to its anode and through the magnet coil 44 to a +200 v. source terminal.

Upon restoration of tube 66 to its normal state;

that is, with the left triode section non-conductive and the right triode section conductive, tube 45 will again be restored to its blocked condition and magnet 44 will release its stepping mechanism.

The circuit arrangement which includes tubes 63, 66 and 45, together with the stepping magnet 44 is duplicated for each of the indicator setting mechanisms. Tube 65 is one of 32 such tubes which are used to gate the screen grids of the same number of tubes such as 63. The branch connections, as previously stated may be led to vertical rows of gating tubes 63. These rows will be selected one after the other by the higher order of counts in the counting chain 53, whereas individual tubes 63 will be selected one after another by the counts of lower digital order in the counting chain 53, working through the matrix 57.

At no time will the magnet 44 be energized if the counting pulse comes through for selecting it while the indicator drum stands at a position corresponding to the read-out of the stored data.

From the foregoing description, it should be understood that I have provided suitable equipment for the actuation of a plurality of pulse-responsive electro-magnetic mechanisms such as the indicator drum 71 and its stepping magnet 44 so as to display any suitable characters corresponding to whatever data is stored in the cyclic storage device. All of the different indicator setting mechanisms and associated electronic circuit control devices which require response to the read-out signals will be actuated by gating pulses which are applied in very rapid succession to one setting mechanism after another, but the overlap in the setting operations is adjusted to permit sufficient time for any setting movement to be completed. During each complete cycle of the reading-out operation covering all the categories of items for different indicators, it is possible to actuate the setting mechanism for any individual indicator so as to make only one step. Not more than ten steps are required for completing the setting operation. Therefore, each indicator will be brought into its proper indicating position after not more than ten cycles of the storage device.

It will be understood by those skilled in the art that various modifications of my invention may be made without departing from its spirit and scope. The number of indicators which may be comprehended in a system may be more or less than the 1024 which have been used for purposes of explaining the principle of operation. Characters other than the ten digits may also be displayed, and the indicator drum may be settable to any one of more or less than ten display positions. Other types of indicators may also be used. The rotary drum type has been shown merely for purposes of illustration. Other memory systems than those of magnetic storage may also be used for transferring intelligence to the circuit arrangement as shown. These and many other modifications will naturally suggest themselves to those skilled in the art.

I claim:

1. A data storage and posting system comprising a plurality of indicator units for displaying numbers or other characters, impulse-responsive means for setting said units step-by-step, a data storage device having magnetizable record tracks and recording and reading instrumentalities adapted respectively to transcribe and to read coded intelligence, decoding means, circuits for feeding pulses from said reading instrumentalities to said decoding means, circuits common to said setting means of all the indicator units for transmitting control pulses thereto, as delivered by said decoding means, selector means including gating devices individual to each of said indicator units for gating said control pulses thereto in the order of read-out of items of said coded intelligence, and means controlled by the position to which any indicator is set, when that position differs from what is called for by a gated control pulse, for causing the setting means to advance its indicator by one step.

2. A system in accordance with claim 1 and including individual conductors, each corresponding to a different position to which an indicator unit may be set, these conductors being comprised in said circuits which are common to said setting means of all the indicator units.

3. A data storage and posting system comprising electro-mechanically settable indicator units for displaying information corresponding to what is stored in the record tracks of a magnetic data recording and read-out device, step-by-step setting means for each of said units, an electronic gate subject to joint control by concurrent pulses from a plurality of sources for actuating said setting means, a seeker switch operatively associated with each indicator unit and having a wiper in circuit with control means for its electronic gate, said switch also having terminals equal in number to the number of character display positions of the indicator unit, a decoding device having input circuits receptive of reading signals from said read-out device, and output circuits each connected in parallel to corresponding ones of said terminals in different seeker switches, said decoding device being effective to place gate controlling potentials on all but one of the terminals of a selected seeker switch, that one terminal being comparable with the switch position which corresponds with the signal currently read-out, and synchronizing means operatively associated with a counting chain for effecting sequential control of said gates corresponding to the order of read-out of the magnetically stored items, the last said means being constituted as one of the plurality of sources which delivers said concurrent control pulses to said gates.

4. Apparatus for setting indicators to display currently stored statistical data or other intelligence, comprising a magnetic record medium, means to store thereon in classified order different data items, cyclically operable means for successively scanning said stored items and for generating a train of code signals which convey the intelligence of said items one after another, a plurality of seeker switches each operatively associated with a different one of said indicators, a plurality of conductors equal in number to the number of display positions to which an indicator may be set, said conductors being individually parallel-connected to corresponding terminals of each seeker switch, a code translator operable to impress an inert potential on a selected one of said conductors and a control potential on the remaining conductors, the selection being in accorance with the purport of each stored item as successively scanned, pulse generating and counting means operative at the cadence of item scanning, selecting circuits and gates under control of said counting means for conditioning each indicator in succession to respond to a control pulse from said code translator, and a step-by-step actuator for each indicator operable under control of its respective gate whenever a pulse of said control potential reaches the gate through the associated seeker switch, said actuator being disabled whenever an inert potential reaches the gate by virtue of correspondence between the setting of the indicator and the purport of the stored item pertaining thereto.

5. A system for transferring magnetically stored items of statistical data to indicators, comprising a magnetic record medium having storage capacity for a plurality of coded statistical items, a plurality of indicator units, one for each category of items, each of said indicator units having a seeker switch operatively associated therewith, circuits corresponding to different positions to which the indicator unit and its seeker switch may be set, an electronic gate subject to joint control by an impulse through one of said circuits when extended through the seeker switch of a selected indicator unit and by a timing pulse which causes the indicator selection to correspond with a magnetic read-out of a stored item, scanning and code translating means for obtaining successive readouts of items pertinent to the several indicator units, and an electronic counting chain and matrix combination for delivering such a timing pulse to each of a plurality of such gates in succession and at the cadence of readout of successive stored items.

6. Pulse responsive electro-mechanical setting mechanism operative in rapid succession in respect to the setting of a plurality of indicator units to correspond with code signals received from a given source, comprising electromagnetic stepping means for shifting each indicator unit to display one character after another, comparison means operatively associated with each indicator unit for determining whether or not its setting should be changed to agree with a character selection signal applicable thereto, electronic gates subject to joint control by concurrent pulses from a plurality of sources for initiating the operation of said stepping means, there being a gate individual to each indicator unit, a unilaterally conductive matrix for decoding said signals and for supplying certain of said concurrent pulses to said gates whenever said comparison means so permits, an electronic counting chain actuated at the cadence of reception of said code signals, means of the unilaterally conductive matrix type actuated by said counting chain for supplying others of said concurrent pulses to said gates, thereby to operate the same in a sequence which corresponds to the appropriate application of said code signals to each indicator unit, and thus to effect a single step operation of each said stepping means the indicator unit for which fails to register a character corresponding to the applied signal.

7. A data storage and posting system comprising a cyclically scannable data storage device having discrete magnetizable record areas and recording and reading instrumentalities adapted to transcribe and to read out coded intelligence, a plurality of pulse-responsive electromagnetic mechanisms to display characters corresponding to data stored in the cyclically scannable storage device, means including said reading instrumentalities for obtaining a read-out of successively scanned items of said data during each scanning cycle, means for directing the read-out effect of each successively scanned item to an appropriate and a different one of said electromagnetic mechanisms, and means for causing the actuation of said mechanisms to occur only when there is a lack of agreement between the item as stored and the currently displayed character, said actuation being limited to a one-step movement of the mechanism following its response and during any scanning cycle and being repeated during successive scanning cycles until agreement is reached.

8. A system according to claim 7 and including means for translating code element combinations as recorded in said storage device into directed read-out effects.

9. In combination, a plurality of pulse-responsive electromagnetic display units settable step-by-step to display different characters, setting mechanism including an electronic gate for actuating each unit, a cyclically scannable memory device having assigned recording positions corresponding to each of said display units, scanning means for obtaining a cyclic read-out of character-representing codes as currently recorded in said positions, a decoding matrix for producing a selective effect corresponding to the character which is represented by a given code, a comparator operatively associated with each said unit and its gate and arranged to transmit a control pulse to said gate in response to one of said selective effects whenever there is a lack of agreement between the current setting of the particular display unit and the character code scanned at the corresponding position of said memory device, and synchronizing means for coordinating the successive scanning of codes with the application of said selective effects to different ones of said gates, thereby to cause each said display unit to be actuated by its setting mechanism whenever one or more setting steps are needed to cause the display of the character represented by the selective effect, each step being taken singly per cycle of the scanning.

10. A data storage and posting system comprising a cyclically scannable data storage device having discrete magnetizable record areas for storing coded signals representing data in regard to a plurality of different items, a plurality of pulse-responsive electromagnetic mechanisms for displaying characters corresponding to the data stored in the cyclically scannable device, recording and reading instrumentalities adapted to transcribe and to read out the coded intelligence, means for obtaining successive read-outs of all the stored data items during each scanning cycle, means for directing the read-out effects of said successively scanned items to appropriate and different ones of said electromagnetic display mechanisms, and means for concurrently actuating all of those display mechanisms in which there is a lack of agreement between the items as stored in the storage device and the currently displayed characters, said actuation being limited to a one-step movement of the display mechanisms during each scanning cycle and being repeated during successive scanning cycles until agreement is reached.

HAROLD F. MAY.

REFERENCES CITED

The following references are of record in the file of this patent:

UNITED STATES PATENTS

| Number | Name | Date |
|---|---|---|
| 2,052,539 | Frischknecht et al. | Aug. 25, 1936 |
| 2,096,954 | Bellamy et al. | Oct. 26, 1937 |
| 2,410,540 | Wight et al. | Nov. 5, 1946 |
| 2,476,066 | Rochester | July 12, 1949 |